US008561233B2

(12) United States Patent
Navan et al.

(10) Patent No.: US 8,561,233 B2
(45) Date of Patent: Oct. 22, 2013

(54) INFECTION CONTROL BEDDING PRODUCT (75) Inventors: William Navan, Howth (IE); David Woolfson, Newcastle (IE)

(73) Assignee: Pneuma Pure I.P. Limited, Dublin (IE)

( * ) Notice: Subject to any disclaimer, the term of this patent is extended or adjusted under 35 U.S.C. 154(b) by 558 days.

(21) Appl. No.: 12/678,124

(22) PCT Filed: Sep. 15, 2008

(86) PCT No.: PCT/EP2008/062265
§ 371 (c)(1),
(2), (4) Date: Jun. 15, 2010

(87) PCT Pub. No.: WO2009/034193
PCT Pub. Date: Mar. 19, 2009

(65) Prior Publication Data
US 2010/0306923 A1    Dec. 9, 2010

(30) Foreign Application Priority Data
Sep. 13, 2007   (IE) .................................. S2007/0653

(51) Int. Cl.
*A47C 27/00* (2006.01)
*A47G 9/02* (2006.01)
(52) U.S. Cl.
USPC .......... 5/652.1; 5/724; 5/699; 5/939
(58) Field of Classification Search
USPC ........... 5/652.1, 704, 724, 725, 638, 699, 939
See application file for complete search history.

(56) References Cited

U.S. PATENT DOCUMENTS

| 4,445,241 | A | 5/1984 | Ender et al. |
| 4,637,377 | A | 1/1987 | Loop |
| 5,038,431 | A | 8/1991 | Burgin et al. |
| 6,351,864 | B1 * | 3/2002 | Karafa et al. ..................... 5/733 |
| 6,516,482 | B2 * | 2/2003 | Karafa et al. ..................... 5/733 |
| 6,964,074 | B2 * | 11/2005 | Carlitz ............................. 5/699 |
| 7,827,637 | B2 * | 11/2010 | DeFranks ........................ 5/699 |
| 7,975,331 | B2 * | 7/2011 | Flocard et al. ................... 5/423 |

(Continued)

FOREIGN PATENT DOCUMENTS

| EP | 1192925 | 4/2002 |
| EP | 1222886 | 7/2002 |

(Continued)

OTHER PUBLICATIONS

Written Opinion and International Search Report for Application No. PCT/EP2008/062265, 6 pages.

(Continued)

*Primary Examiner* — Robert G Santos
(74) *Attorney, Agent, or Firm* — Faegre Baker Daniels LLP (57) ABSTRACT A hermetically sealed infection control bedding product such as a pillow, duvet, mattress, cushion or such like having a sealed cover and having a resiliently deformable filling material, comprising a vent means in the cover, characterized in that the vent means comprises a filter medium including a filter membrane for the removal of particles of microbial size and wherein the filter medium also comprises a strengthening layer of material for providing mechanical strength to the filter medium whereby the filter medium allows air flow therethrough but is substantially impermeable to liquid while maintaining a barrier to particles of microbial size.

27 Claims, 9 Drawing Sheets (56) References Cited

U.S. PATENT DOCUMENTS

| | | | |
|---|---|---|---|
| 2002/0148047 A1* | 10/2002 | Corzani et al. | 5/738 |
| 2002/0178506 A1* | 12/2002 | Corzani et al. | 5/737 |
| 2003/0121101 A1* | 7/2003 | Corzani et al. | 5/487 |
| 2003/0163870 A1* | 9/2003 | Porter et al. | 5/490 |
| 2003/0172458 A1* | 9/2003 | Bonfanti et al. | 5/490 |
| 2005/0034243 A1 | 2/2005 | Carlitz | |
| 2006/0075567 A1* | 4/2006 | DeFranks | 5/699 |
| 2008/0098529 A1* | 5/2008 | Flocard et al. | 5/652.2 |
| 2009/0083908 A1* | 4/2009 | Fry | 5/636 |
| 2010/0306923 A1* | 12/2010 | Navan et al. | 5/652.1 |
| 2011/0004997 A1* | 1/2011 | Hale et al. | 5/699 |

FOREIGN PATENT DOCUMENTS

| | | |
|---|---|---|
| JP | 5-111513 | 5/1993 |
| JP | 2002-155448 | 5/2002 |
| JP | 2005-230137 | 9/2005 |

OTHER PUBLICATIONS

Gore Medical Membranes, Filter Medium Data Sheet, 2004, 1 pg.
Redwood Distribution Ltd., Ice Data Sheet, 2013, 1 pg.

* cited by examiner

INFECTION CONTROL BEDDING PRODUCT

CROSS-REFERENCE TO RELATED APPLICATION

This application is a National Stage filing of International Application Serial No. PCT/EP2008/062265, filed Sep. 15, 2008, which claims the benefit of Irish Application Serial No. S2007-0653, filed Sep. 13, 2007, the disclosures of which are expressly incorporated herein by reference.

The present invention concerns improvements in and relating to a hermetically sealed infection control bedding product such as a pillow, duvet, mattress, cushion and such like. The present invention also relates to a method of manufacture of a vented hermetically sealed infection control bedding product.

BACKGROUND TO THE INVENTION

Infection control and cross infection present a major problem for hospitals today, leading to considerable expense and inconvenience. Bacterial strains have developed which are increasingly more resistant to treatment by antibiotics. Therefore, once an infection is established in a hospital, it is often difficult to eradicate and can spread quite rapidly. A problem known as "strikethrough", where a contaminated fluid penetrates to an interior of a infection control bedding product such as a pillow, duvet, mattress, or cushion, is well known. If "strikethrough" occurs, then there is a considerable risk of cross infection associated with any of these infection control bedding products since they are likely to be used subsequently by many different patients. Indeed, this problem arises in any situation where there is a regular change in persons using pillows, duvets and the like, such as, for example, in hotels and guesthouses. Furthermore, in the home, many people with allergies and breathing disorders have problems with fungal infection and dust mites.

There are numerous commercially available materials typically used for waterproof covers on mattresses, typically comprising a knitted or woven nylon fabric, with a thermoplastic coating, typically polyurethane, applied. The knitted or woven fabric provides mechanical strength, while the thermoplastic (polyurethane) coating provides waterproofing.

Some such fabrics are termed "vapour permeable" because tiny pores exist at sub-micron level in the coating, that nominally allow transport of water vapour molecules. However, these fabrics do not allow transfer of air at sufficient rates to ventilate a pillow.

U.S. Pat. No. 4,637,377 discloses a surgical pillow for supporting the heart or other body organs of a patient during surgical procedures. The surgical pillow disclosed in U.S. Pat. No. 4,637,377 has a foam filled casing with a vent in the casing to permit release of entrapped air within the casing upon compression of the pillow during use.

U.S. Pat. No. 5,038,431 discloses a pillow for dispensing medication. The pillow has an outer sheet forming a pocket for reception of filling material. The pocket has a vent opening and the filling material is impregnated with a medicament. When the vent is open, a person is exposed to medicament vapour which escapes through the vent opening.

These prior art pillows do not address the problem of "strikethrough".

U.S. Pat. No. 4,445,241 discloses an air tight and fluid tight cover for padded bodies, mattresses and the like. The cover has a top, a bottom and a plurality of side parts. At least one opening provides ventilation between the interior of the cover and the ambient atmosphere. At least two of the side parts are formed by at least an interior, middle and exterior layer of material. Air passage openings offset with respect to each other are provided in the interior and middle layers of material. At least one filter is disposed between the middle and outer layer of material. A plurality of connecting seams extend partially transversely across the width of the side part from diametrically opposite points of the upper and lower longitudinal edges of the side parts toward a longitudinal center line bisecting the side part. The connecting seams define a plurality of pockets in which the filters are disposed. The connecting seams also define air passages between the individual layers of material for trapping coarse granular particles therein.

U.S. Pat. No. 4,445,241 discloses a moisture and air-tight cover for a pillow in which welded seams are provided to constitute pockets for reception of filters for particles and bacteria. This is a complex product which is difficult and expensive to produce. The seams define a serpentine air passage between the interior and exterior of the pillow and each air stream contains at least two filters. However, these filters are not, and cannot be, physically connected to one another by welding or otherwise, as in the present invention, and in fact at least one filter at the outer opening of the air passage can be removed through slit-shaped openings 28 (see column 4, lines 13 to 15). The serpentine passage actually provides a breeding ground for bacteria thus defeating the purpose.

A further distinction and advantage of the present invention as compared to U.S. Pat. No. 4,445,241 is that the filter cannot be removed from the pillow deliberately or inadvertently, thereby possibly compromising the filtration, as is possible with the design of U.S. Pat. No. 4,445,241.

A major problem to overcome when developing a sealed pillow is to ensure adequate ventilation of the pillow core. A pillow may be made airtight by using an occlusive medium for the cover, and welding the seams. However, the lack of ventilation in such a pillow creates problems in use, such as the following problems:

1) When the head rests on the pillow, the pillow does not deflate. This is uncomfortable, and creates an unstable surface for the head to rest on.
2) Impact to the pillow, either accidentally or when the head first makes contact, creates a great deal of stress on the seams, which may burst as a result.
3) Gradual ingress of water vapour particles by diffusion creates condensation within the pillow, leading to accelerated degradation of the materials within.

Furthermore, many attempts have been made to provide pillows, cushions or mattresses that have a barrier for contaminant particles or liquid, but none has been entirely successful. The best effort to date and currently in use in the healthcare sector, is the pillow disclosed in the Applicants' patent specification no. EP 1 222 886. Nevertheless, the infection control bedding product of the present invention provides significant advantages over the pillow disclosed in EP 1 222 886.

European Patent Specification No. EP 1 222 886 discloses a pillow comprising a sealed outer liquid impermeable cover, filling material retained within the outer cover, a vent in the cover communicating between an interior and an exterior of the cover and a bacteriological air filter means mounted across the vent to provide for filtering of air passing through the vent, wherein the filter comprises an outer layer of liquid-resistant material with a number of superimposed inner filter material layers attached to the outer layer, and wherein the material layers are welded together and to the cover across the vent. Provision of a bacteriological filter prevents the ingress of bacteria to an interior of the cover.

The outer layer of the filter of the pillow disclosed in EP 1 222 886 does not provide adequate liquid resistance. Even if a filter medium constructed using the same materials as the outer layer of the EP 1 222 886 filter could be made to be fully liquid resistant, such a filter medium would not provide adequate ventilation for the product to breathe, resulting in ballooning of the pillow in use. This would provide an uncomfortable surface for a user to rest on, and could burst from internal pressure when in use. In addition, the method of welding each of the five layers of the filter of EP 1 222 886 is time consuming and inhibits the viability of the product from a mass production and commercial point of view.

For example, EP 1 222 886 only teaches a liquid resistant as opposed to a liquid proof outer layer to the filter. The textile disclosed in EP 1 222 886 is a nylon material which will admit liquid at relatively low levels of pressure (i.e. relative to the membrane of the present invention). If the textile disclosed in EP 1 222 886 was made liquid proof, it would require that the pore size would be reduced to such an extent that such pore size would prevent the pillow from "breathing" or deforming, or inhaling/exhaling to the required level.

The present invention addresses and solves these technical problems. As will be further described in detail hereinbelow, the filter membrane included in the present invention is more like a strengthened skin that breathes through osmosis. This is in contrast to the filter of EP 1 222 886 which must be more coarse in order to form part of the product and is only liquid resistant rather than liquid proof. The pillow of EP 1 222 886 has a woven synthetic outer textile backed by non-woven polyester layers. The membrane of the present invention is fundamentally different from the medium disclosed in EP 1 222 886.

The filter membrane in accordance with the present invention overcomes a number of technical problems. The filter membrane included in the present invention, being like a thin skin, must be strengthened so that the infection control product of the present invention would be fit for use in the environment in which it would be used and so that it could withstand the challenges that are likely to be present in use. This needed to be achieved without compromising key properties of the filter medium and the pillow including filtration of contaminants and "breathability" of the pillow.

EP 1 222 886 discloses the welding together of five or six layers of material. If, as is taught in EP 1 222 886, each layer is welded to the other and then to the liquid resistant outer fabric and then the whole medium is welded across the aperture in the pillow, then the process becomes non-viable from a manufacturing and mass production point of view. If they are all welded together in one action, then the seal integrity and consequently, the pillow is compromised as the strength and integrity of the seal between each individual layer is compromised. Further, the drawings and description of EP 1 222 886 illustrate that the filter medium should run diagonally and be welded at one end into the top seam of the pillow and at the other end into the side seam of the pillow. This means that a further thick 2 thick layer of PU-coated fabric need to be welded through, in addition to the 5/6 layers of the medium, thereby giving rise to further manufacturing challenges and quality/integrity issues. In other words, EP 1 222 886 does not teach a product that when mass-produced can provide the benefits of the present invention.

A further problem that emerged with the pillow disclosed in EP 1 222 886 was that the filter medium itself as well as the seal between the filter medium and the pillow cover could burst or tear if pressure equivalent to a patient leaning on their elbow, was applied directly on the filter medium itself. Therefore, a further problem overcome by the present invention is the provision of a new and vastly improved filter medium that could withstand pressure of this nature whilst providing efficient bacteriological properties.

The filter medium disclosed in EP 1 222 886 is described as efficient to block the passage of particles having a size of 0.6 microns or greater whereas the present invention including a new medical membrane design which has been proven to be efficient to block the passage of particles having a size of 0.2 microns or greater. Therefore the present invention addresses a greater number and wider category of possible contaminants.

Accordingly, the present invention relates to an improved infection control bedding product, e.g. a pillow, having technical improvements in particular, superior liquid resistance over the pillow disclosed in EP 1 222 886.

SUMMARY OF THE INVENTION

According to the present invention, there is provided a hermetically sealed infection control bedding product such as a pillow, duvet, mattress, cushion or such like having a sealed cover and having a resiliently deformable filling material, comprising: a vent means in the cover, characterised in that the vent means comprises a filter medium including a filter membrane for the removal of particles of microbial size and wherein the filter medium also comprises a strengthening layer of material for providing mechanical strength to the filter medium, whereby the filter medium allows air flow therethrough but is substantially impermeable to liquid while maintaining a barrier to particles of microbial size.

Thus the infection control product of the present invention has the advantage that the vent allows air to pass through so as to provide ventilation for the pillow while preventing liquid including water moisture, water droplets, human sweat, sputum, urine from passing through the vent.

Accordingly, the problems associated with the prior art are overcome by incorporating into the cover of the pillow, a vent comprising a filter medium which allows substantial air flow, but is substantially impermeable to liquid and maintains a barrier to particles of microbial size.

Conveniently, an aperture is formed in the cover of the product and is adapted to receive the vent.

Ideally, the aperture in the cover of the infection control product is located so that the seam of the filter medium and aperture is not integral with any perimeter seam of the cover of the infection control product.

Preferably, the layer of strengthening material comprises a material providing mechanical strength, and advantageously may comprise a spun non-woven synthetic material such as polypropylene (PP).

Preferably, the filter medium includes a means for substantially preventing fluid ingress, while allowing air to permeate. Conveniently, the liquid resistance may be achieved by virtue of the filter membrane being manufactured of a hydrophobic material or oleophobic material.

Advantageously, the filter membrane comprises a thermoplastic non-woven material which may include polytetraflouroethylene (PTFE).

In the preferred embodiment, the filter membrane is manufactured of an oleophobic expanded polytetrafluoroethylene (PTFE) material. Ideally, the filter membrane is manufactured of an oleophobic PTFE membrane and also includes a non-woven polyvinyl chloride (PVC) membrane support.

The filter membrane functions as a bacteriological filter. This has the advantage that it prevents the ingress of bacteria to an interior of the cover.

Advantageously, the filter membrane is adapted to block passage of particles having a size of 0.2 microns or greater.

Preferably, the pore size of the filter membrane is between 0.2 microns and 4 microns, and is preferably between 0.5 microns and 4 microns, and may be between 1 and 4 microns. Advantageously, the pore size of the filter membrane may be a size between 2 and 4 microns.

Given the low micron size of the pore size of the filter membrane, there is a risk that if the filter medium of the present invention was incorporated in a pillow in the same way as described in EP 1 222 886 that the internal pressure when a patient exerts a force onto the pillow would cause the pillow to tear. It should be noted that the same risk applies to the majority of the uses to which the filter medium is suited e.g. wheelchair cushion, mattress and so on.

Accordingly, in the preferred embodiment, the filter medium comprising the filter membrane and strengthening material are bonded together and to the cover of the infection control product, at an aperture in the cover of the infection control bedding product such as a cushion, pillow, duvet, mattress or such like so as to provide a vent in the infection control bedding product. The bonding of the layers together is preferably achieved by welding. In the most preferred embodiment, the vent includes a gasket (PU) and the gasket is also bonded with the filter medium to the cover of the infection control product so as to achieve a sealed vent.

Advantageously, the cover of the infection control bedding product such as a pillow is manufactured of polyurethane coated polymeric material, for example polyurethane coated nylon.

Most preferably, the infection control product of the present invention includes a gasket which is ideally of dimensions corresponding to the dimensions of the aperture in the cover of the infection control product into which the vent will be located and subsequently bonded to the cover of the infection control product.

Conveniently, the gasket is manufactured of the same material as the cover of the infection control product. Advantageously, the gasket is manufactured of a thermoplastics material such as polyurethane (PU). The inclusion of the gasket in the vent of the infection control product ensures that the edges of the assembled vent comprising the filter membrane/strengthening layer and gasket bonded to the cover fabric of the bedding product (such as a pillow cover) are sealed and impermeable to liquid.

After the components of the vent have been located in the aperture in the cover of the product, all of the components of the vent together with the cover of the infection control product itself are bonded together in a manner that provides a seal which is impermeable to liquid.

The present invention also provides a method of manufacture of the hermetically sealed infection bedding product comprising the steps of a) providing a filter membrane
b) providing a strengthening layer
c) providing a cover of the bedding product, the cover having an aperture adapted to receive the filter membrane and strengthening layer; and
d) affixing the layers a), b) and c) together so that the layers are affixed together to form a seal which is impermeable to liquid.

Ideally, between steps (b) and (c), a gasket is provided and the gasket is also affixed with the filter membrane and the strengthening layer to the cover of the product.

Conveniently, the step of affixing the layers together may be achieved by bonding such as by glueing or welding as the layers must be affixed together so as to form a seal which is impermeable to liquid.

DETAILED DESCRIPTION OF THE INVENTION

The invention will now be described more particularly with reference to the accompanying drawings, in which are shown, by way of example only, two embodiments of a pillow in accordance with the present invention.

The embodiments shown in the drawings comprise an infection control pillow but of course, it is to be understood that many other infection control bedding products could be manufactured in accordance with the present invention.

Figure 1:
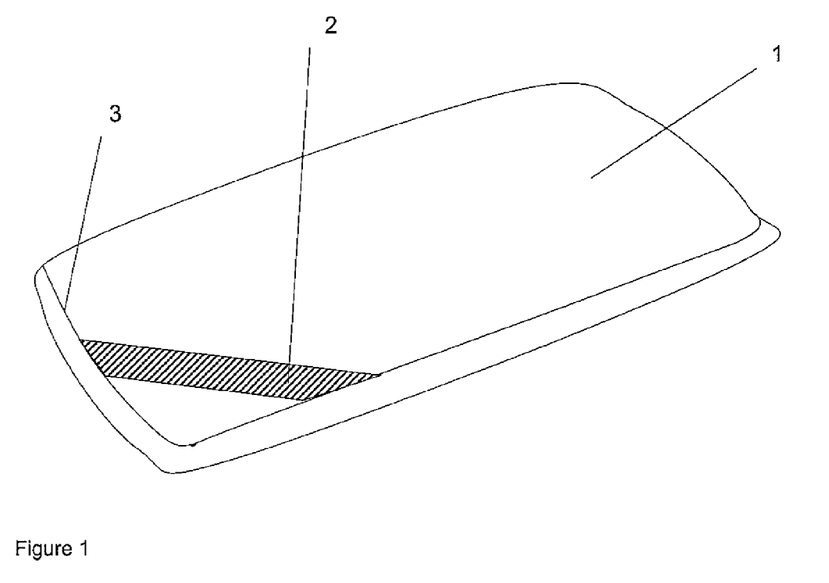
FIG. 1 is a perspective view of the outside of a first embodiment of a pillow in accordance with the invention.

Referring now to FIG. 1, a first embodiment of a pillow in accordance with the invention is indicated generally by reference numeral 10. The pillow 10 comprises a waterproof coated fabric cover 1 and incorporates a section of filter medium 2. The pillow is, preferably, ultrasonically welded at seams 3. The fabric cover 1 encases the filling of the pillow and is formed of a weldable material which is coated in polyurethane which provides a fluid resistant (waterproof) coating on the cover.

The filter medium comprises a filter membrane which may comprise a non-woven membrane, made of thermoplastic material. In the preferred embodiment, the filter membrane is manufactured of an oleophobic expanded PTFE membrane having a membrane support backing comprised of a non-woven polyvinyl chloride (PVC). The PVC backing layer is fused or laminated to the PTFE filter membrane. It has been found by experimentation that the optimal pore size of the filter membrane for this use is in the range of 2-4 microns. This pore size allows sufficient air-flow to ventilate the pillow dynamically when impacted by a user's head. Air flow through the pillow of the invention, has been measured and found to be in the region of 20-40 Litres per minute per square centimeter at 1 bar differential pressure. This pore size has also proved by experimentation to have 100% filtration efficiency in terms of removing microbial load, while providing resistance to water in the region of 0.2-0.8 bar entry pressure.

The intrinsic mechanical weakness of the necessarily thin PTFE/PVC filter membrane is overcome by providing an additional strengthening layer of a synthetic material such as polypropylene, preferably spun fibre polypropylene, which provides mechanical strength to the filter membrane. This assembly is referred to as the "filter medium", indicated generally by reference numeral 2 in FIG. 1.

Figure 2:
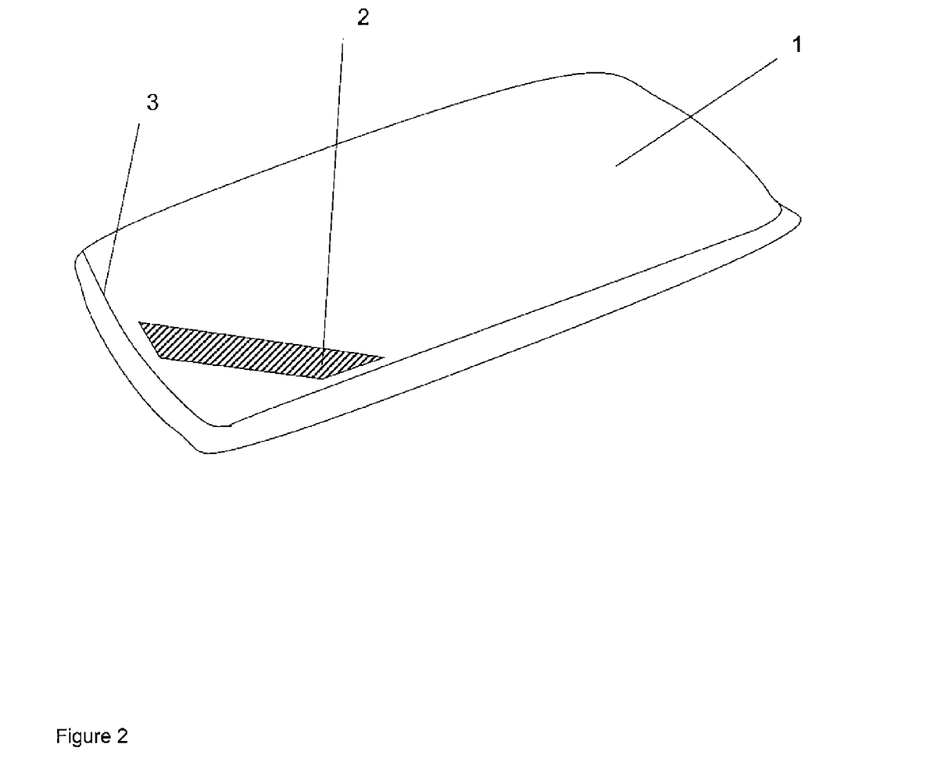
FIG. 2 is a perspective view of the outside of a pillow in a second embodiment.
Figure 3:
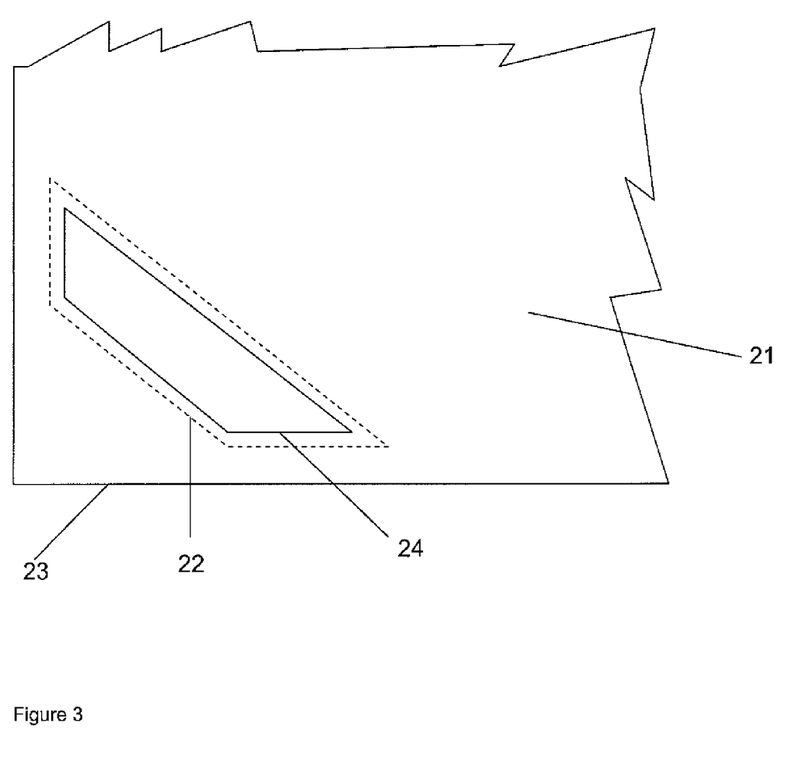
FIG. 3 is a plan view of the inside of a pillow in the second embodiment.
Figure 4:
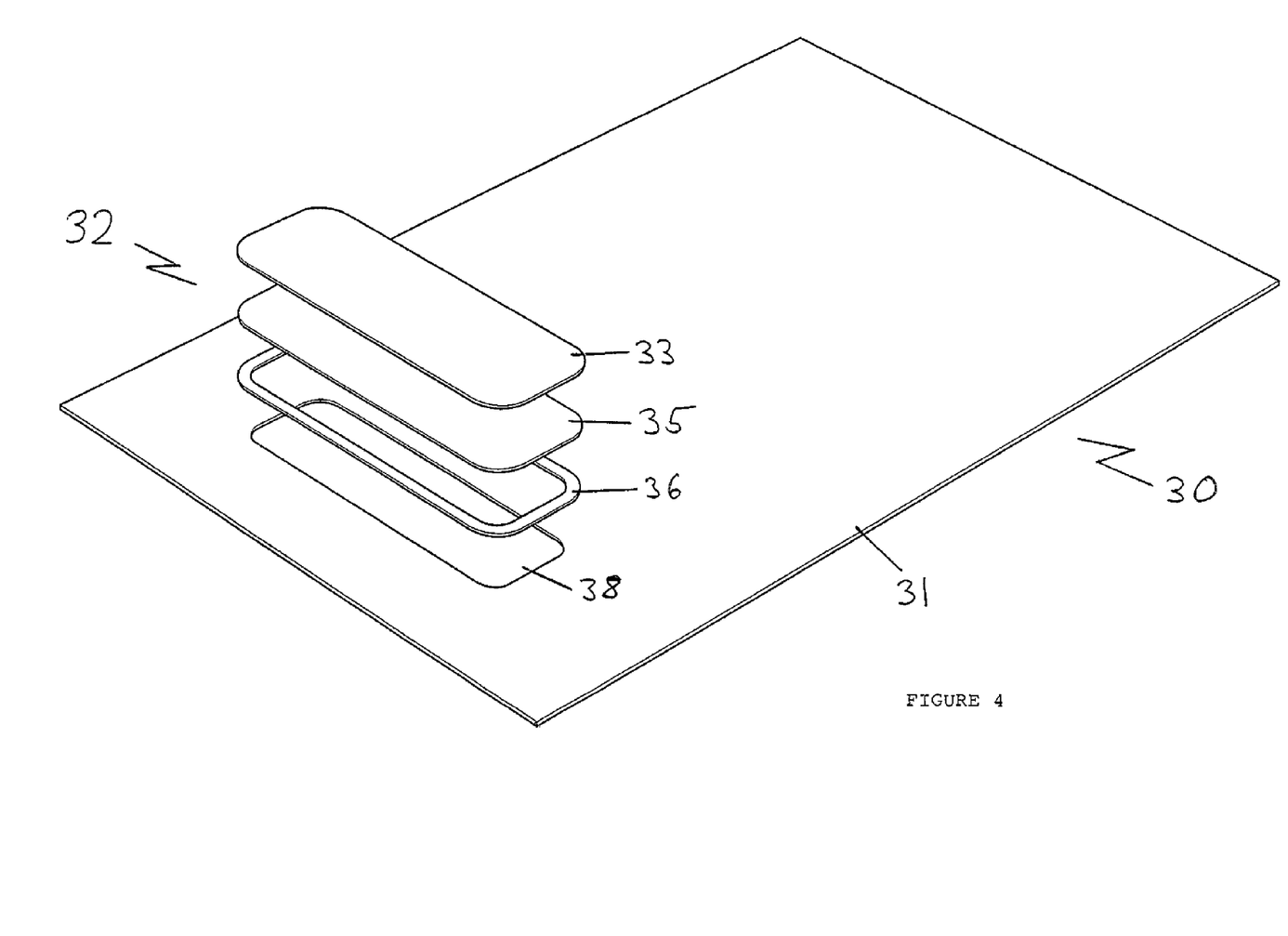
FIG. 4 is an exploded view of the layers of materials included in a third and most preferred embodiment of the infection control bedding product of the present invention.
Figure 5:
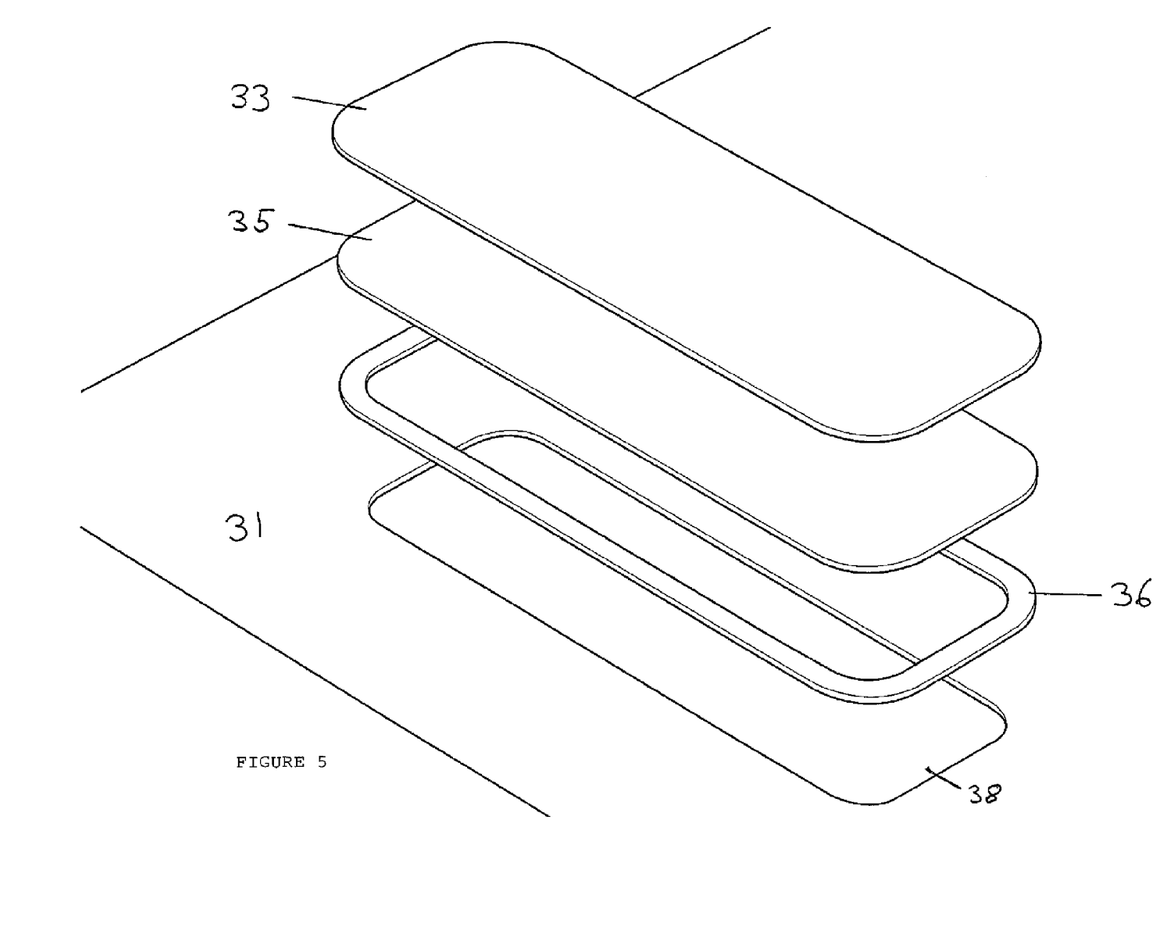
FIG. 5 is a close up of the exploded view of the infection control bedding product in the third embodiment, shown in FIG. 4.
Figure 6:
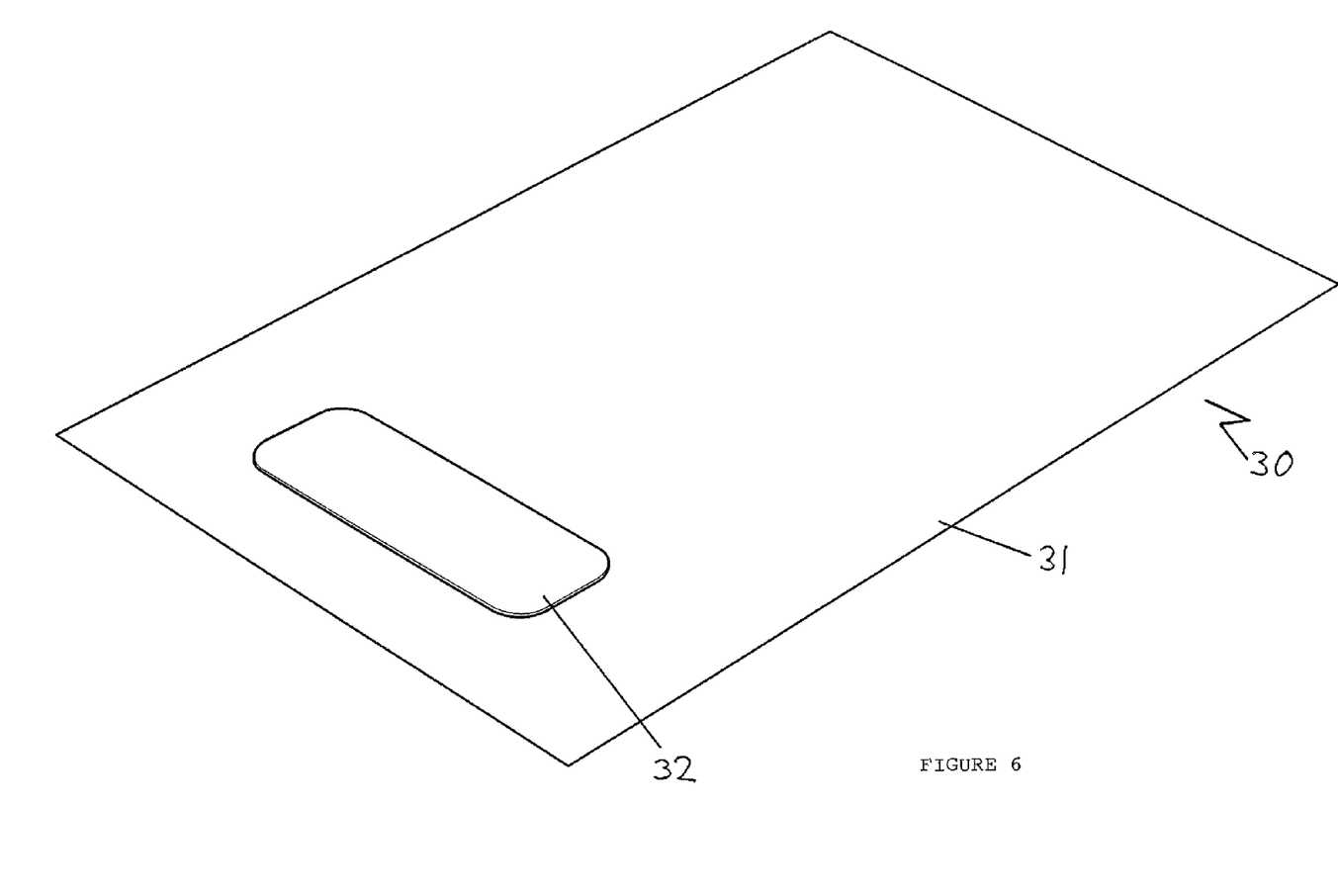
FIG. 6 is a perspective view of the third embodiment of the infection control bedding product of FIGS. 4 and 5, with the layers now shown assembled on the infection control pillow product.
Figure 7:
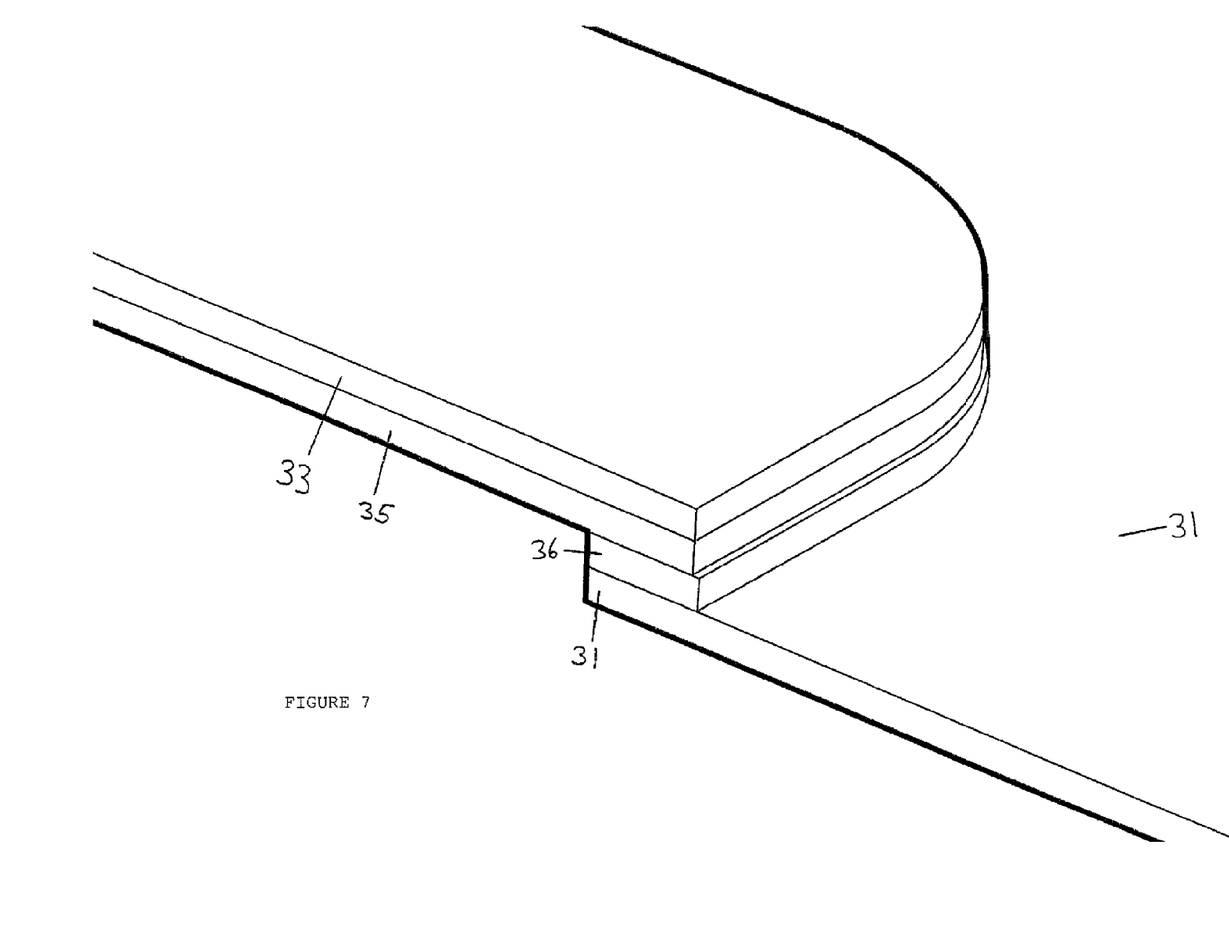
FIG. 7 is an exploded cross sectional view of the assembled layers including the pillow cover, PU gasket, spun-bonded polypropylene strengthening layer and the medical membrane stacked on top of each other, in situ, before welding. (After welding, the layers will be compressed together)

Referring now to FIGS. 2 and 3, a preferred arrangement for welding the various components together will be described. In the drawings, like numerals refer to like features of the pillow in the first and second embodiments.

In the first embodiment of the pillow 10, the filter medium 2 spans the entire corner of the pillow 10 and so the filter medium 2 is incorporated into the welded seam. However, it was found by experimentation that if a pillow bursts in use, the most common point of failure was the welding seam, at that point where the filter medium 2 is incorporated into the seam. This mechanical failure was thought to be happening for two reasons:

1) The geometry of the seams renders them subject to peel forces; and
2) The weld strength when welding the filter medium 2 to another substrate is substantially stronger when the expanded polytetrafluoroethylene (PTFE) (strength-providing) layer is next to the substrate to which the material is being welded. On the other hand, if the waterproof layer (i.e. non-woven PVC) is next to the substrate to which the filter medium is being welded, delamination of this waterproof layer may occur, and a strong weld is not achieved.

The geometry of the first embodiment of the pillow 10 in which the filter medium is incorporated into the seam dictates that, for the waterproof PVC layer to be facing outwards which is necessary to avoid wetting of the expanded polytetrafluoroethylene (PTFE) layer), the waterproof PVC layer had to comprise the welded face of the filter medium. This arrangement gave rise to a weaker weld than was desired.

Accordingly, a second embodiment is provided and a pillow in this second embodiment of the invention is shown in FIGS. 2 and 3. The pillow in this second, preferred embodiment, is indicated generally by reference numeral 20 and comprises a waterproof pillow cover 21, a filter medium 22, and seam 23. The cover 21 is manufactured of polyurethane-coated nylon. Referring to FIG. 3, in the second embodiment, the pillow 20 includes a window 24 which is die-cut in the cover material 21. This window 24 may be any shape, and is substantially removed from the seams 23 of the pillow. FIG. 3 shows the inside of the pillow cover 21.

As shown in FIG. 3, the filter medium 22 is cut so that it is a similar shape and of similar dimensions to those of the window (aperture) 24 except that the filter medium 22 is slightly larger than the window 24 to allow overlap of the filter medium 22 beyond the edges of the window 24. The orientation of the filter medium 22 is such that the filter membrane/waterproof layer is facing outwards (away from the viewer in this figure) and the support layer which provides mechanical strength, forms the facing layer for welding to the coated side of the pillow cover.

This arrangement solves both of the mechanical failure problems by removing the filter medium 22 from the seam area, to an area where no peel forces are experienced, and by maintaining the correct orientation of surface contact between media for welding.

With the filter medium of the present invention, the filter membrane provides the liquid resistance, but allows for air permeability due to the construction of the PVC backing. The addition behind the filter membrane of the strengthening layer, preferably manufactured of a spun non-woven polypropylene (PP) material (alternatively, other synthetic materials could be used for this purpose), provides the additional strength required around the welded join of the filter medium to the window/strip provided in the pillow cover for the application of the filter. This is achieved because of the strengthening layer being formed of meltable material (i.e. the non-woven PP) being melted into the PU coating of the pillow cover fabric as well as into the filter membrane, thereby providing a stronger welded seam to prevent the risk of the infection control product bursting.

In addition, the window/strip is designed so that the seams (joining edges) of the filter medium/window are not integrated with the main perimeter welded seam of the pillow where it would weaken the overall strength of the seam. Therefore, the window has been re-designed in such away that its edges or "frame" is separate and distinct from the edges of the pillow cover allowing for the strong weld of the medium/window described whilst maintaining the integrity of the main welded seam of the pillow.

In the second embodiment which is shown in and described with reference to FIGS. 2 and 3, only one vent is provided on the pillow 20. However, it will be understood that any number of vents may be provided as required, each with an appropriate bacteriological filter medium associated therewith.

Referring now to FIGS. 4, 5, 6 and 7, a third embodiment of the infection control bedding product will now be described. In the drawings of the product in the third embodiment, like numerals refer to like features shown of the first and second embodiment.

Referring initially to the FIGS. 4, 5, 6 and 7, the infection control pillow in the third embodiment is indicated generally by reference numeral 30 and the pillow 30 includes a vent indicated generally by the reference numeral 32. The infection control pillow 30 includes a pillow cover 31, a vent 32 comprising a polyurethane (PU) gasket 36, spun-bonded polypropylene strengthening layer 35 and filter membrane (also referred to hereinbelow as a medical membrane) 33. After each of these components has been affixed together preferably by welding, each of these layers will be compressed together to form the infection control product of the present invention.

Components of the Infection Control Pillow Product in the Most Preferred Embodiment Main Pillow Cover 31 manufactured of polyurethane (PU) coated polyamide—(preferably, Redwood 'ICE' Fabric)

Medical membrane 33 such as medical membrane MMT-302 produced by W.L. Gore & Associates, Inc., 401 Airport Road, Elkton, Md., United States of America.

Spun-bonded Polypropylene membrane 35.

PU gasket 36.

Details of Each Component

Pillow Cover 31

The pillow cover 31 is manufactured of 135 g/m² polyurethane (PU) Coated Polyamide.

The PU coating provides protection against fungi and bacteria.

The infection control product including the vent is washable at 75° C. The infection control product is gentle to the skin and also has the advantage that the inclusion of the vent in the product does not create noise which is, of course, undesirable in particular when the product is used in a hospital environment by a patient.

Filter Membrane (Medical Membrane)

The filter membrane 33 is a breathable membrane which allows air to be expelled from within the pillow when compressed thereby preventing the unwanted effect of 'ballooning' around the patients head/mouth.

The breathable medical membrane 33 also protects the structure (including the RF welded seams) of the infection control product, ensuring the seams are not overstressed when the pillow is compressed, basically preventing a rupture should the entire pillow be compressed.

The medical membrane 33 has been tested vigorously as a microbial barrier and performed extremely well.

Spun-Bonded Polypropylene Layer 35

The periphery shape and dimensions equal to medical membrane 33.

The purpose of including the spun-bonded polypropylene is to add greater strength to the vent area. The spun-bonded polypropylene layer 35 is inserted behind the medical membrane 33 and it prevents simple punctures from hands/fingers.

Polyurethane (PU) Gasket 36

The polyurethane gasket is slightly smaller than the rectangular RF weld area, yet slightly larger than the medical membrane and spun-bonded polypropylene. This ensures that the edge of medical membrane and spun-bonded polypropylene are completely sealed down to the pillow cover surface. Thus the edges of each of the layers are sealed and compressed, thereby resulting in a completely smooth, patient friendly, surface.

The purpose of the PU gasket 36 is to add more plastic to the weld area, allowing more plastic to flow into the Spun-bonded polypropylene layer, the medical membrane 33 and the PU coated pillow cover, increasing the quality/strength of the bond of the various layers.

Welds

1. Long Welds Along the Pillow Cover Edges

The long welds along the edges of the pillow cover are fully RF welded. This gives a seam which is completely impermeable to liquid.

2. Closing Weld to Complete Filled Pillow

Whether RF welded or heat sealed closed, the closing weld encapsulates the pillow filler and completes the impermeable peripheral seam.

Fire Testing

A complete pillow produced in accordance with the process of the invention, filled and sealed, has undergone fire testing. The complete pillow performed extremely well in the fire tests, scoring an FR rating of Crib 5.

Figure 8:
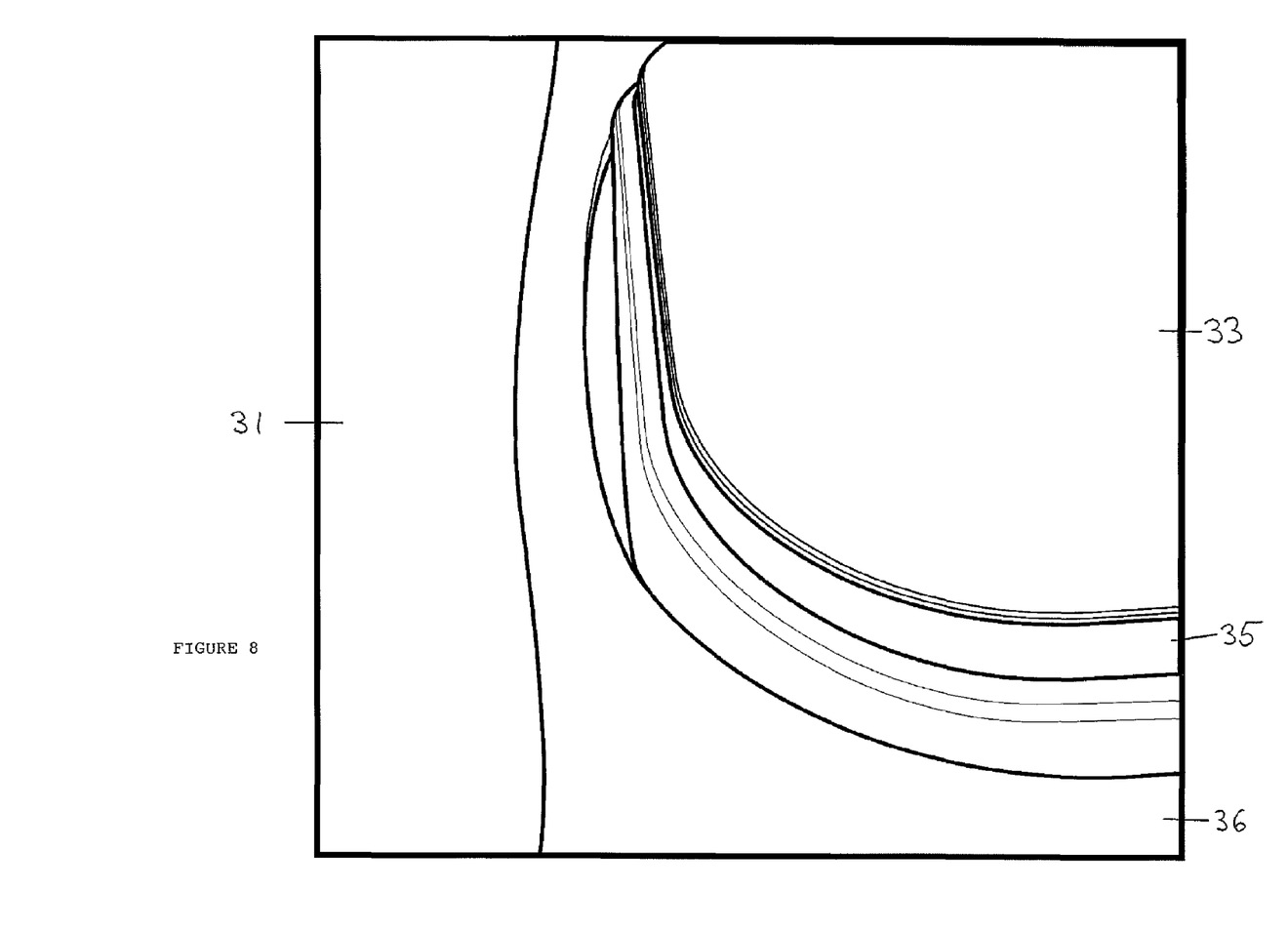
FIG. 8 is a perspective view showing the assembled layers stacked on top of the welding tool with the welding tool surface being dimensioned so that it has a greater surface area than the area of the assembled layers so as to ensure that the respective edges are completely sealed together.

Referring now to FIG. 8, the components of the vent 32 are shown stacked on top of the welding tool. The welding tool has a larger surface than the components, so as to ensure that the edge around the perimeter of the vent 32 and the aperture 38 is completely sealed.

Figure 9:
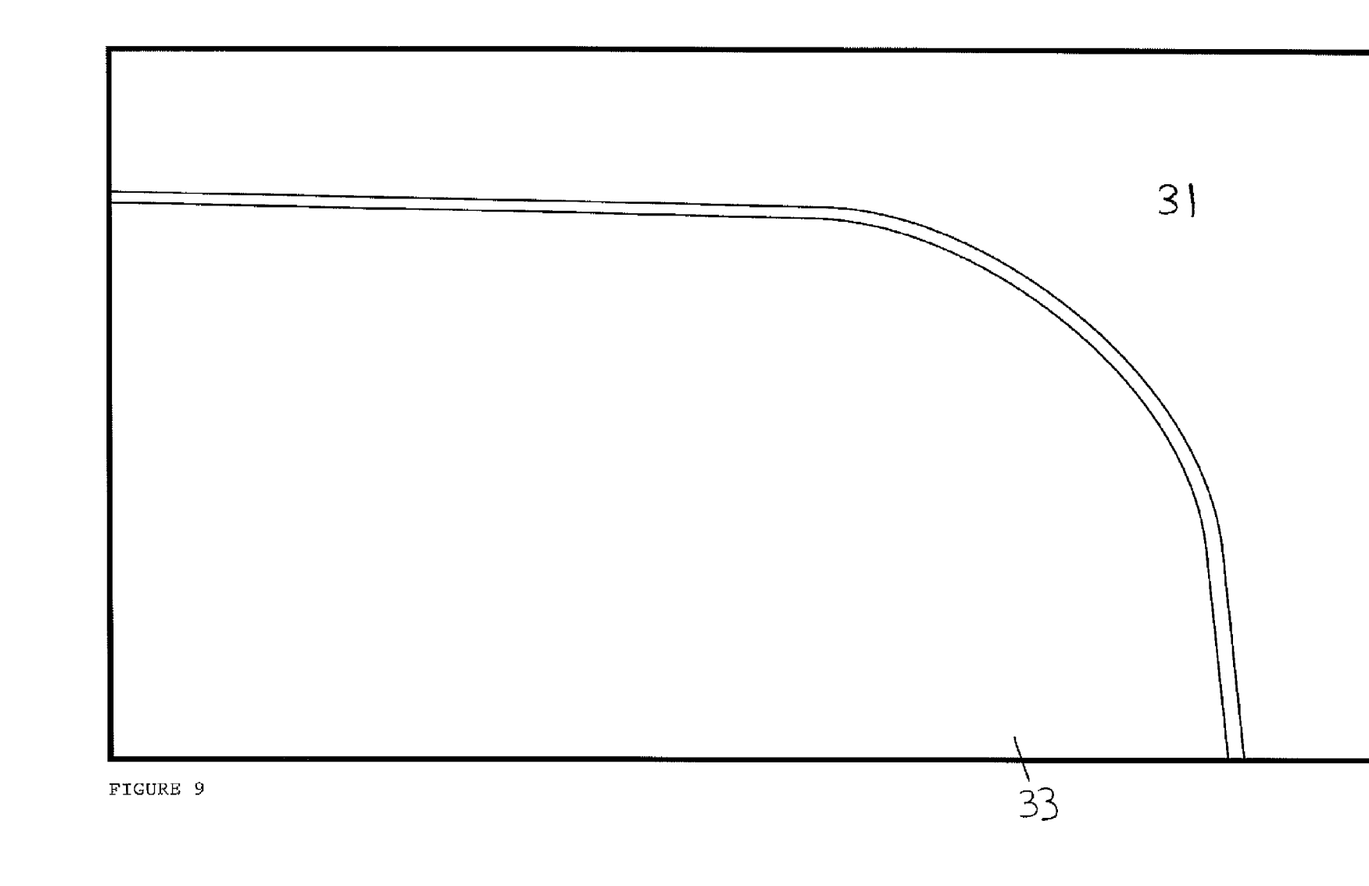
FIG. 9 is a plan view showing the final infection control product with the pillow cover welded to the filter medium and the strengthening layer.

Referring now to FIG. 9, a finished weld is shown, a glossy bead of PU is provided around the perimeter of the membrane 33 and spun-bonded polypropylene 35. The PU ensures the edge is sealed and impermeable.

The method of manufacture of the hermetically sealed infection bedding product such as a cushion, pillow, duvet, mattress or such like, in accordance with the invention comprises the steps of:

a) providing a filter membrane,
b) providing a strengthening layer,
c) providing a gasket,
d) providing a cover of the bedding product, the cover having an aperture;
e) locating the PU gasket, the strengthening layer and the filter membrane in the aperture,
f) affixing the layers a), b), c) and the cover of the product together so that the layers are sealed together and are impermeable to liquid, whereby the filter membrane, strengthening material and the gasket are bonded together with the cover of the infection control bedding product, at the aperture in the cover so as to provide a vent in the infection control bedding product.

The layers of the filter medium 32 are bonded together by glueing or welding such as heat welding, ultrasonic welding, compression welding or RF welding. Preferably, the bonding is carried out by RF welding with the RF welding apparatus operating in a range of 27.12 MHz±160 Kilohertz.

In order to produce the infection control pillow 30, a welding apparatus is used in which the welding action required is performed effectively. The method for producing the infection control product 30 as described above ensures that the product 30 can be replicated and mass produced.

Thus, the present invention provides a pillow or the like which is particularly advantageous for use in hospitals and other medical institutions as a safeguard against the spread of bacteria and Hospital Acquired Infection (HAI), in general. The present invention can also be applied to other bedding products such as mattresses, cushions including wheelchair cushions and duvets, for example, which similarly have a sealed cover containing resiliently deformable filling material.

It will be appreciated that though the invention has been described with reference to a hermetically sealed pillow, the invention provides for infection control for bedding and soft furnishings generally. Indeed, advantageously, the invention can be applied in any situation where there is a regular change-over in persons using pillows, duvets and the like to prevent cross-infection. In addition to high risk areas such as hospitals and medical institutions generally, the invention can be applied more widely in other situations where there is a regular turnover of persons using this type of bedding and furnishings, such as in hotels, guesthouses and the like. The infection control pillow and bedding products of the invention may also be used in domestic applications to avoid problems with dust mites and fungal infections. It is also envisaged that this type of pillow product could be incorporated in headrests for airline seating, as well as having military applications including sleeping bags and the like.

It is to be understood that the invention is not limited to the specific details described here which are given by way of example only and that various modification and alterations are possible without departing from the scope of the invention as defined in the appended claims.

The invention claimed is:

1. An infection control bedding product comprising
a cover enclosing a resiliently deformable filling material, the cover including an aperture;
a vent means including a filter medium covering and extending past the perimeter of the aperture and being sealingly attached to the cover, the filter medium including a filter membrane and a strengthening layer of material for providing mechanical strength to the filter medium; and
a gasket to form a liquid impermeable seam between the cover and the vent means,
wherein the filter medium allows air flow therethrough but is substantially impermeable to liquid while maintaining a barrier to particles of microbial size, and
wherein the cover and the vent means are impermeable to liquid.

2. An infection control bedding product as claimed in claim 1 wherein the strengthening layer comprises a thermoplastic material.

3. An infection control bedding product as claimed in claim 1 wherein the gasket is of dimensions corresponding to the dimensions of the aperture vent means.

4. An infection control bedding product as claimed in claim 1 wherein the gasket and the cover comprise a first material.

5. An infection control bedding product as claimed in claim 1 wherein the filter membrane comprises one of a hydrophobic material and a oleophobic material.

6. An infection control bedding product as claimed in claim 5 wherein the filter membrane comprises an oleophobic expanded PTFE membrane and a non-woven polyvinyl chloride (PVC) backing support.

7. An infection control bedding product as claimed in claim 1 wherein the filter membrane comprises a bacteriological filter so as to prevent the ingress of bacteria to an interior of the cover.

8. An infection control bedding product as claimed in claim 7 wherein the filter membrane is adapted to block passage of particles having a size of 0.5 microns or greater.

9. An infection control bedding product as claimed in claim 8 wherein the filter membrane has a pore size of between 0.2 and 4 microns.

10. An infection control bedding product as claimed in claim 1 wherein the cover comprises a polyurethane coated polymeric material.

11. An infection control bedding product as claimed in claim 10, wherein the polymeric material comprises polyamide, and the strengthening layer is disposed between the cover and the filter membrane adjacent to a polyurethane coated side of the polyurethane coated polymeric material.

12. An infection control bedding product as claimed in claim 11 wherein the gasket comprises polyurethane.

13. An infection control bedding product as claimed in claim 1 wherein the aperture is located so that the liquid impermeable seam is not integral with any perimeter seam of the cover of the infection control product.

14. An infection control bedding product as claimed in claim 1, wherein the vent means is configured to ventilate the infection control bedding product.

15. An infection control bedding product as claimed in claim 14, wherein the vent means is configured to have an air flow therethrough of between about 20-40 liters per minute per square centimeter at 1 bar differential pressure.

16. An infection control bedding product as claimed in claim 14, wherein the vent means is configured to have a resistance to water of between about 0.2-0.8 bar entry pressure.

17. A method of manufacture of an infection control bedding product comprising the steps of:
a) providing a filter membrane
b) providing a strengthening layer
c) providing a cover of the bedding product, the cover having an aperture, the filter membrane extending past the perimeter of the aperture when placed over the aperture;
d) providing a gasket between the strengthening layer and the cover; and
e) sealingly bonding the filter membrane and the strengthening layer to the cover over the aperture to form a seam with the cover that is impermeable to liquid, whereby the filter membrane and the strengthening material provide a vent in the infection control bedding product to allow air flow therethrough.

18. A method of manufacture as claimed in claim 17 wherein the gasket and the cover comprise a first material.

19. A method of manufacture as in claim 18, wherein the first material comprises polyurethane.

20. A method of manufacture as in claim 19, wherein the cover comprises polyamide and is coated on one side with the first material, and the strengthening layer is disposed between the cover and the filter membrane adjacent to the polyurethane coated one side of the cover.

21. A method of manufacture as claimed in claims 17 wherein the sealingly bonding step comprises one of RF bonding, adhesive bonding, and welding.

22. A method of manufacture as claimed in claim 17, wherein the vent is configured to ventilate the infection control bedding product.

23. A method of manufacture as claimed in claim 22, wherein the vent is configured to have an air flow therethrough of between about 20-40 liters per minute per square centimeter at 1 bar differential pressure.

24. A method of manufacture as claimed in claim in claim 22, wherein the vent is configured to have a resistance to water of between about 0.2-0.8 bar entry pressure.

25. An infection control bedding product comprising
a cover enclosing a resiliently deformable filling material, the cover including an aperture;
a gasket; and
a filter membrane including a filter medium and a strengthening layer of material providing mechanical strength to the filter medium, wherein the filter medium allows air flow therethrough, is substantially impermeable to liquid and maintains a barrier to particles of microbial size, and extends past the perimeter of the aperture, and
wherein the gasket is disposed between the cover and the filter medium to form an impermeable seal rendering the outer surface of the infection control bedding product impermeable to liquid.

26. An infection control bedding product as in claim 25, wherein the gasket extends beyond the perimeter of the filter membrane to form a vent edge seal.

27. An infection control bedding product as in claim 26, the infection control bedding product further comprising a perimeter seal, wherein the vent edge seal is not integral with the perimeter seal.

* * * * *

UNITED STATES PATENT AND TRADEMARK OFFICE
CERTIFICATE OF CORRECTION

PATENT NO. : 8,561,233 B2
APPLICATION NO. : 12/678124
DATED : October 22, 2013
INVENTOR(S) : William Navan et al.

Page 1 of 1

It is certified that error appears in the above-identified patent and that said Letters Patent is hereby corrected as shown below:

In the Claims:

Claim 3, Column 11, Line 6, delete "aperture"

Signed and Sealed this
Thirty-first Day of December, 2013

Margaret A. Focarino
*Commissioner for Patents of the United States Patent and Trademark Office*